United States Patent Office 3,220,648
Patented Nov. 30, 1965

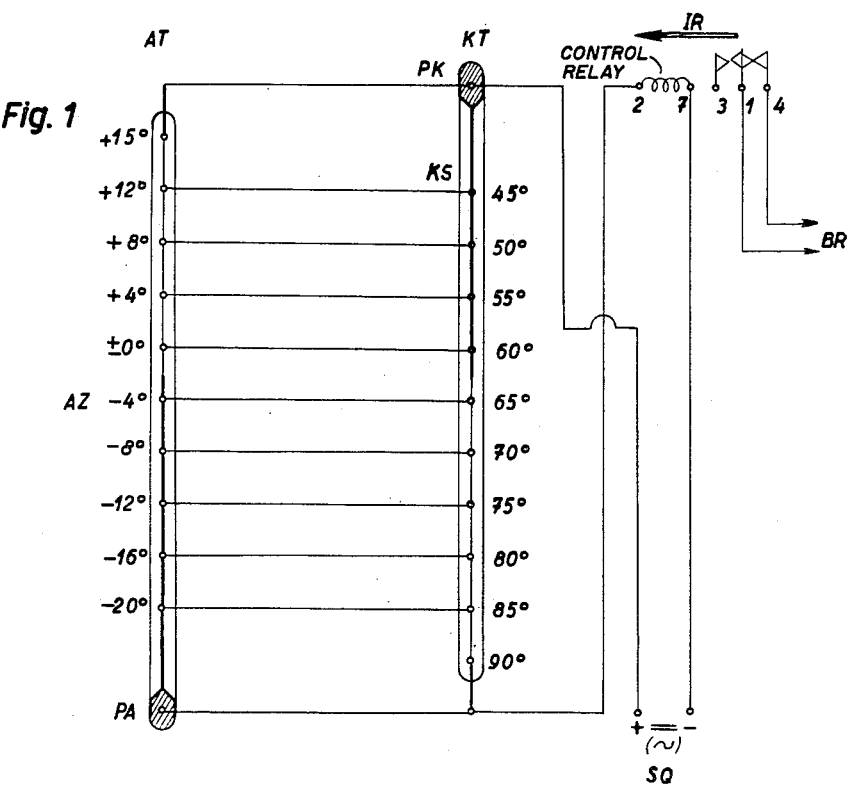
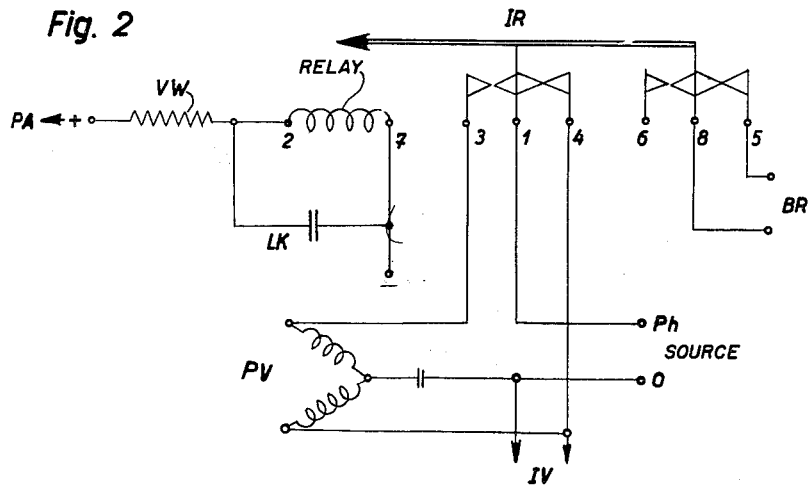

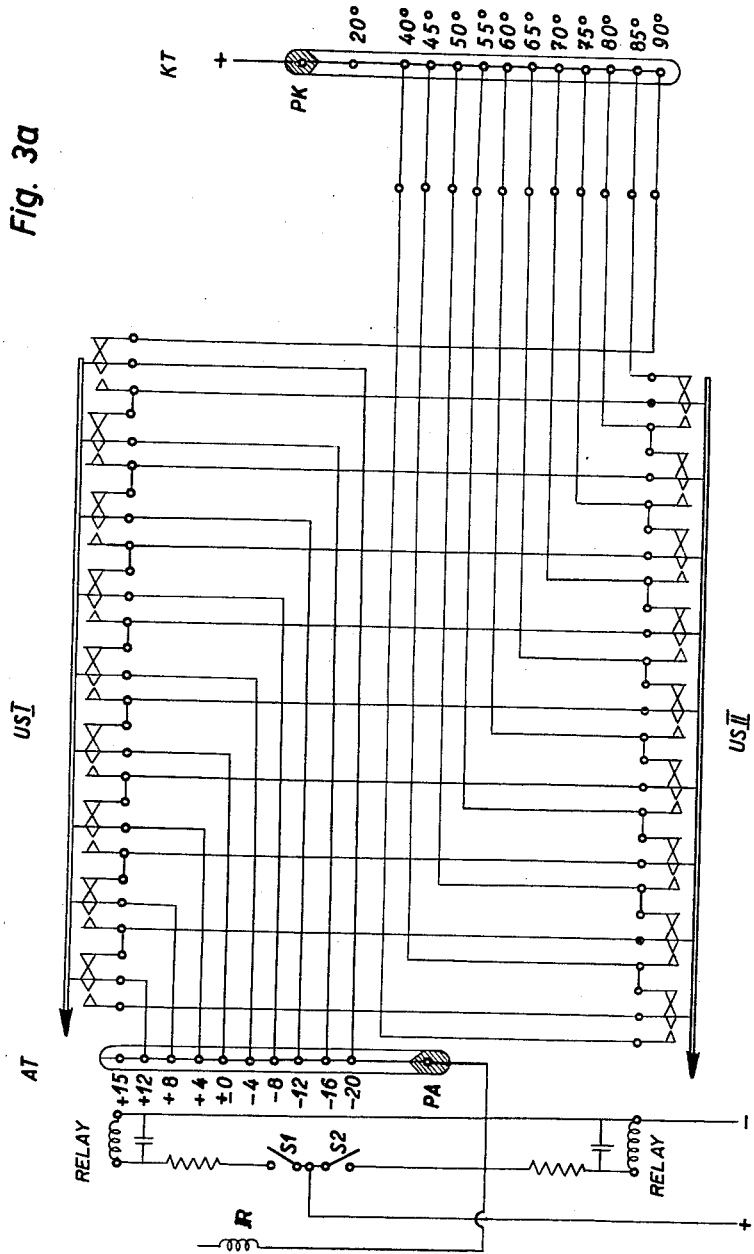

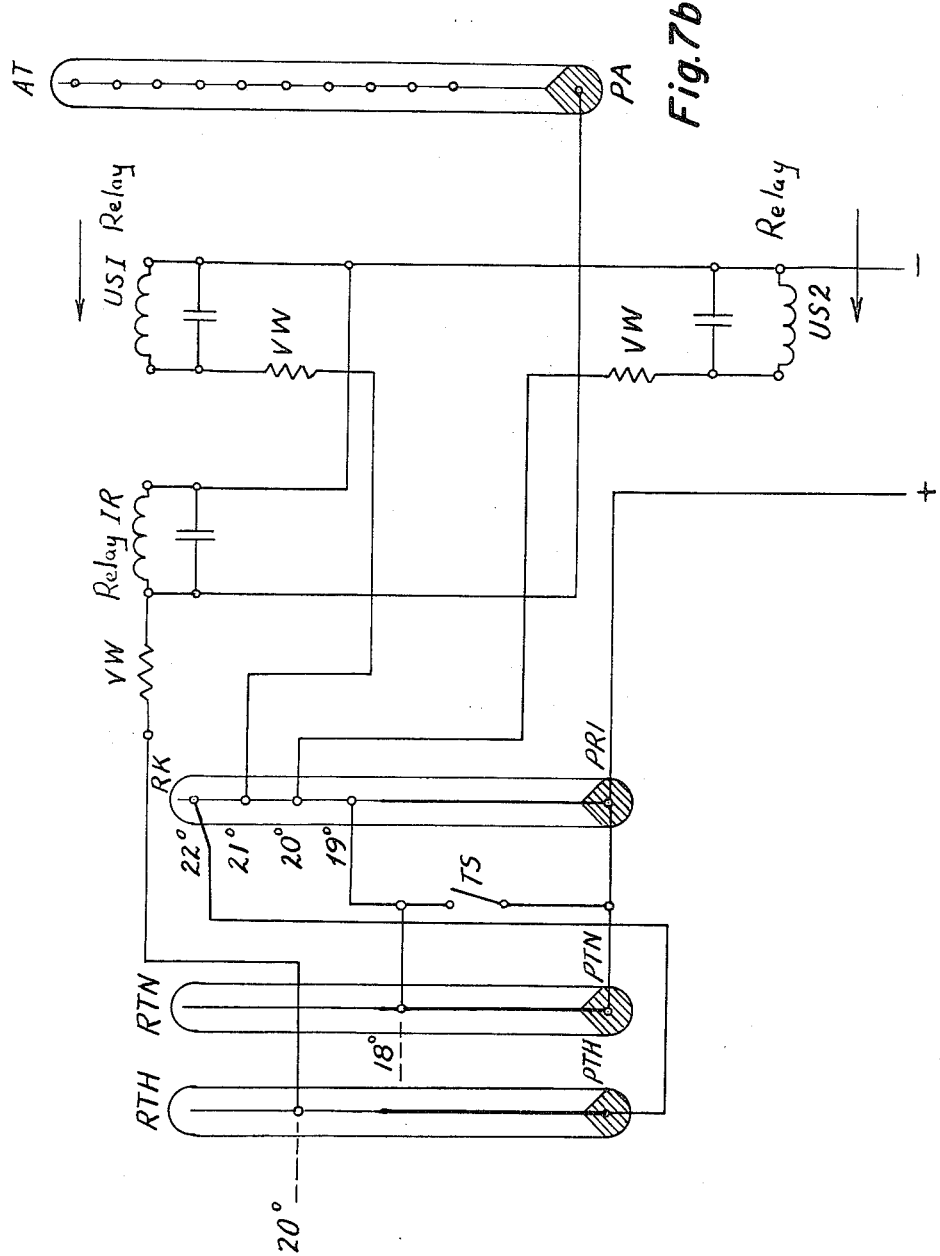

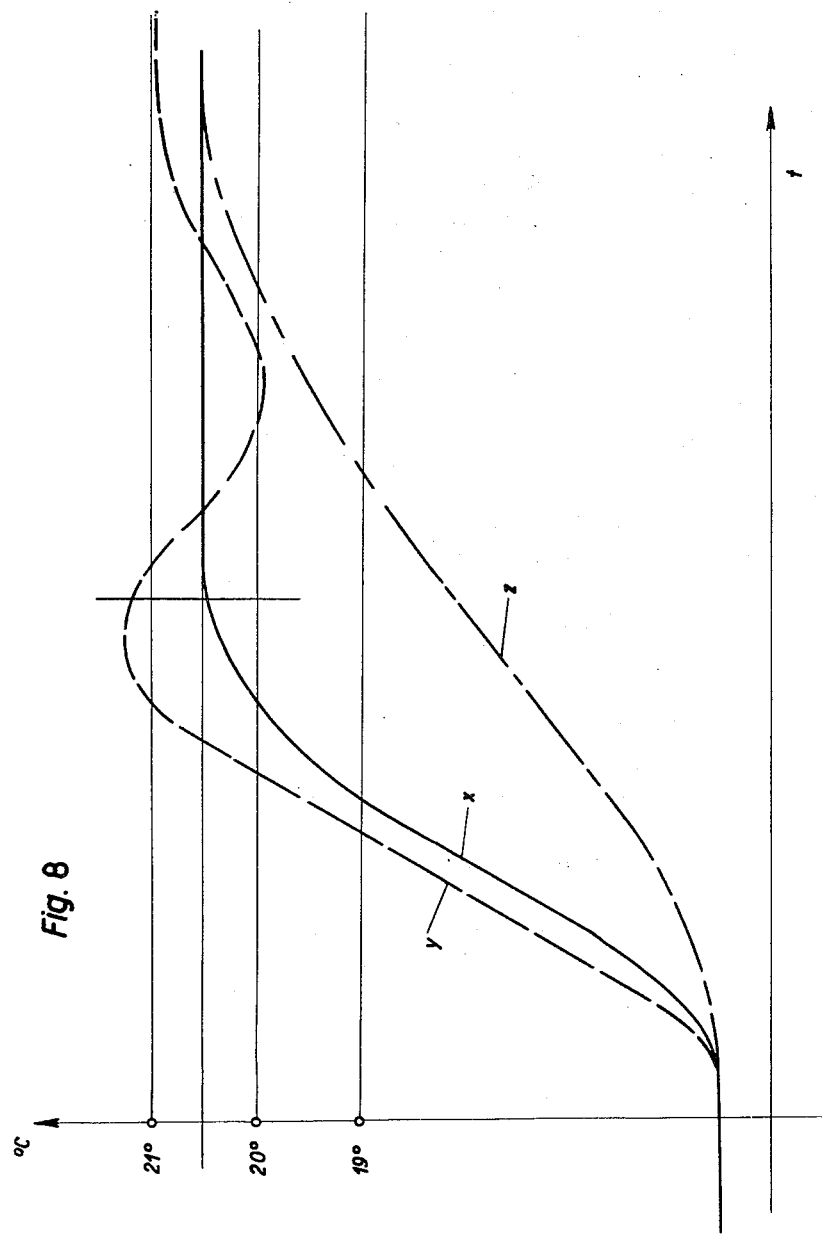

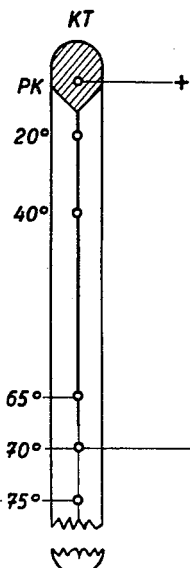
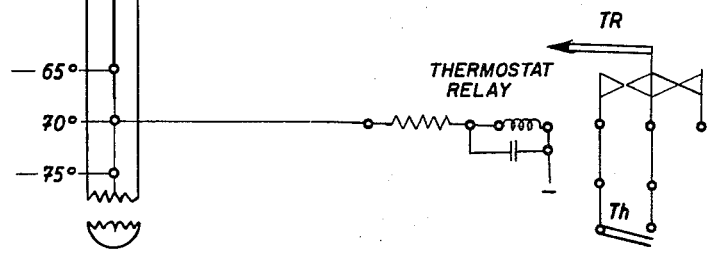
Fig. 9
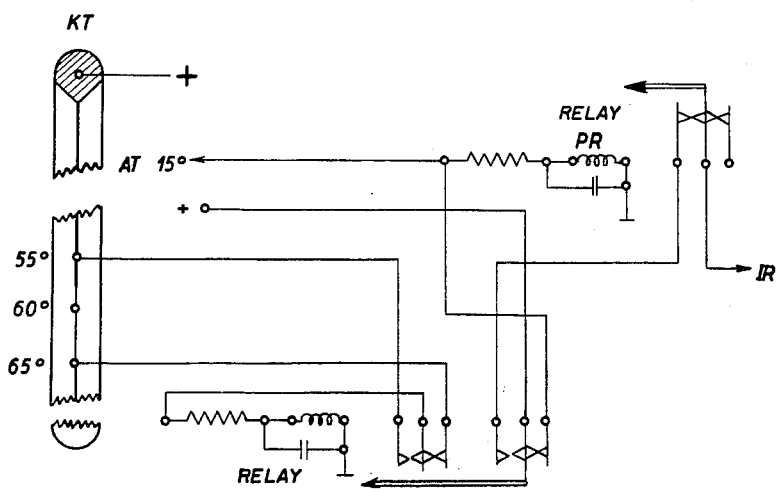
Fig. 10

3,220,648
AUTOMATIC HEATING CONTROL SYSTEM ADJUSTED BY OUTSIDE TEMPERATURE
Ernst Partsch, Frastanz, Austria
Filed Aug. 1, 1961, Ser. No. 128,496
Claims priority, application Switzerland, Aug. 1, 1960,
8,791/60
5 Claims. (Cl. 236—9)

The present invention relates to an automatic heating control system. More particularly, the invention relates to an automatic heating control system which shuts off and restarts a heating plant in functional dependence upon the temperature of the heating medium and also in functional dependence upon a temperature which is independent of the heating medium, such as the ambient outside temperature, and which is intended automatically to adjust itself to external factors or preset quantities. According to a feature of the invention there is provided a thermometer using an electrically conducting thermometric liquid for measuring the independent temperature, such as that of the outside air, and a second thermometer of like kind for measuring the temperature of the heating medium, at least two taps on the temperature scale of one thermometer being electrically connectable with two inversely coordinated points on the temperature scale of the other thermometer, the thermometric liquid at the base of the scales of the two thermometers being included in an electric circuit which shuts off or restarts the heating plant.

According to another feature of the invention, one which improves the flexibility of the system by making it adaptable to existing or desired conditions, there are provided supplementary control means which are illustrated by the accompanying drawings. In order that the present invention may be readily carried into effect, it will now be described with reference to the accompanying drawings, wherein:

FIG. 1 is a simple control system according to the invention,

FIG. 2 is a detail of the control relay and the controlled heating system according to the invention, FIG. 3a is a general layout of an electrically operable multi-position control circuit.

Figure 3B:
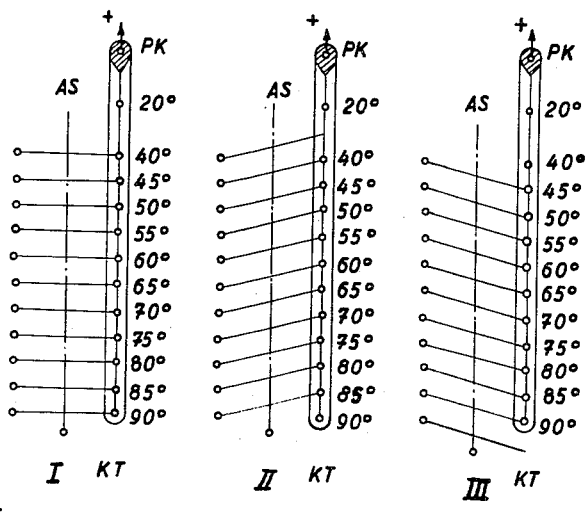
FIG. 3b is a similar control circuit for manual multi-position operation.
Figure 5:
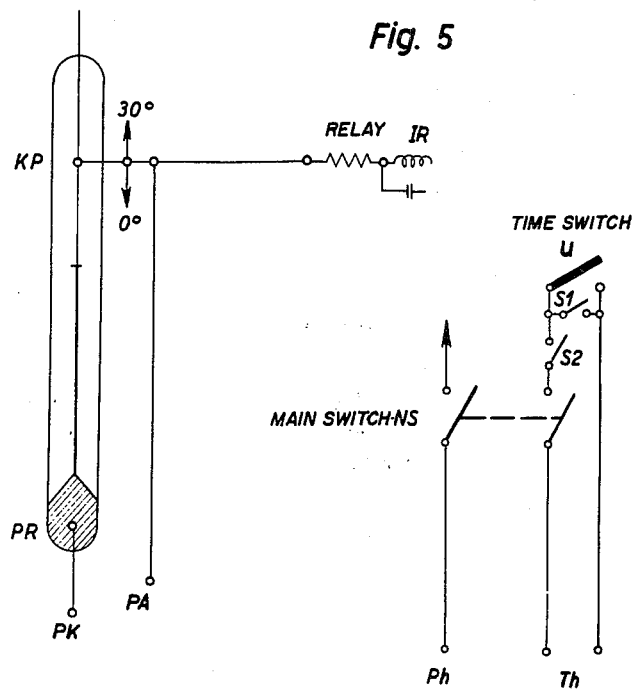
Figure 4:
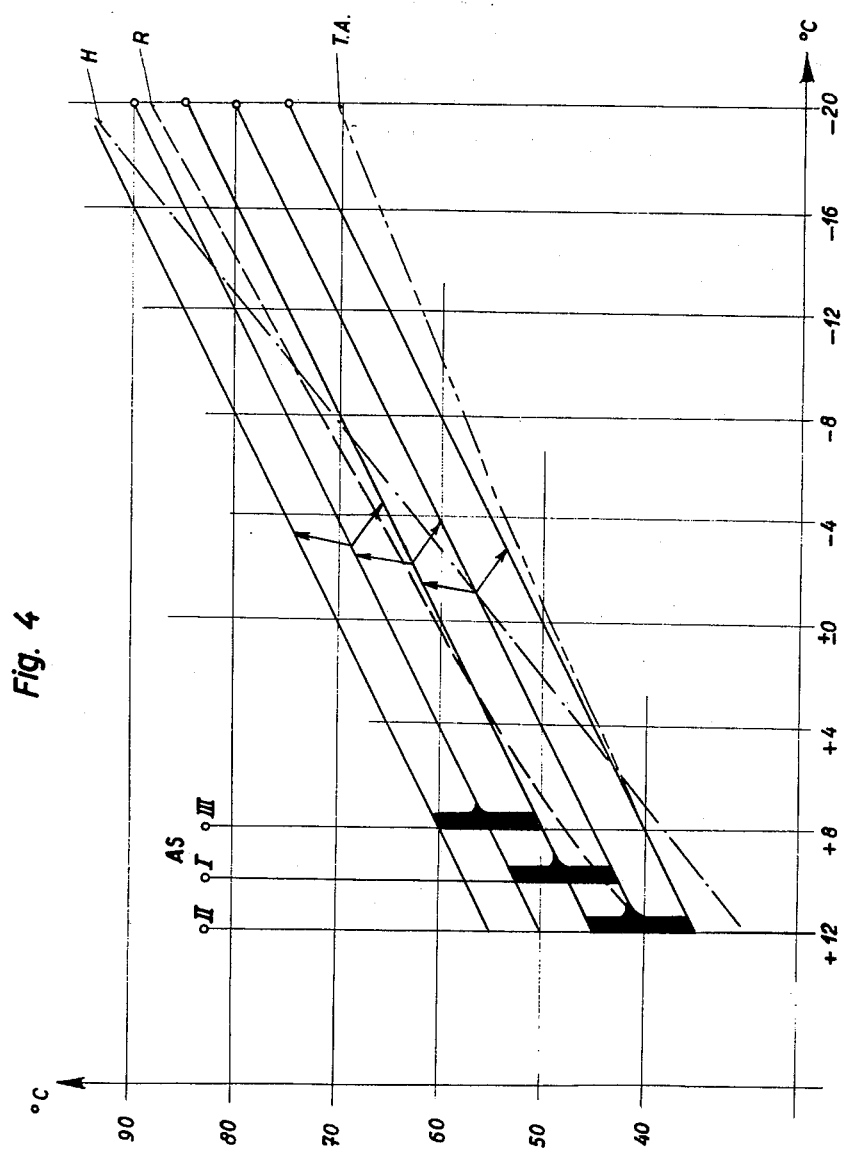
Figure 6:
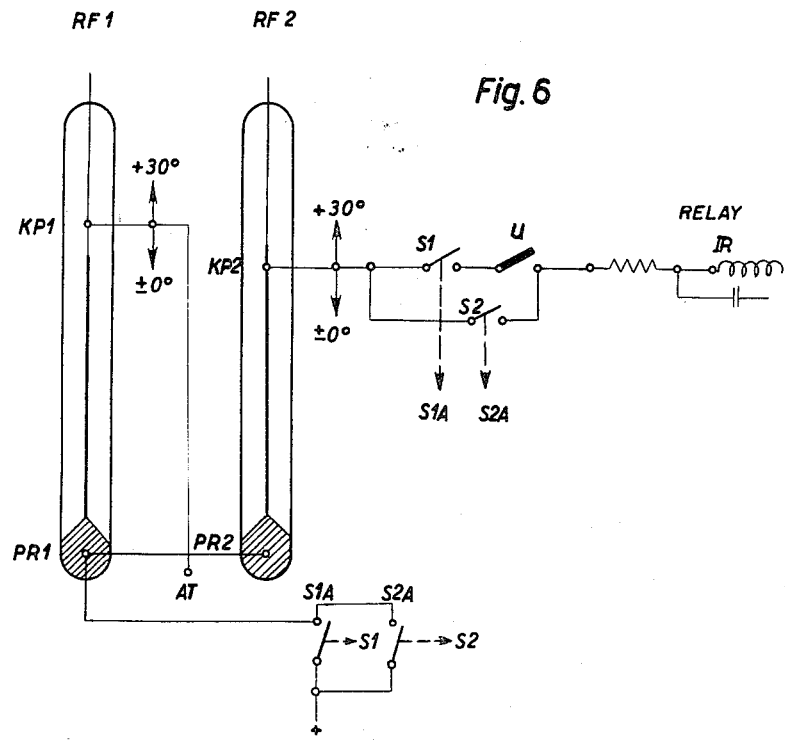
Figure 7A:
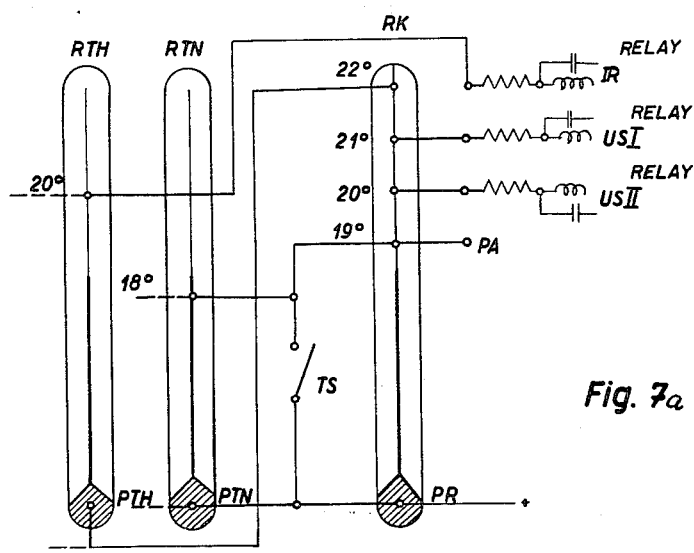
Figure 11:
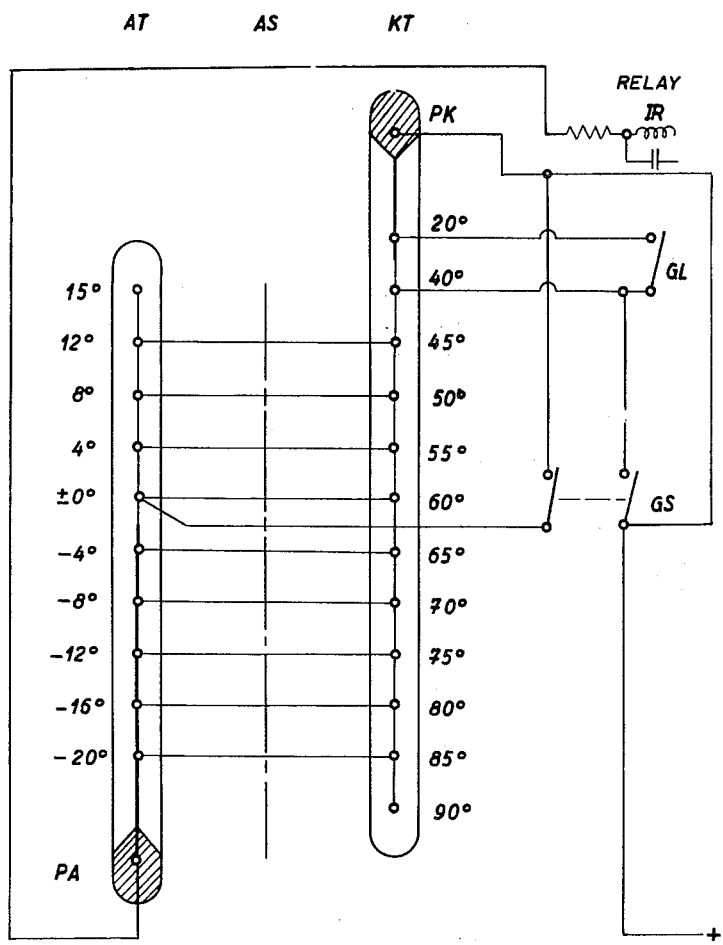
Figure 12:
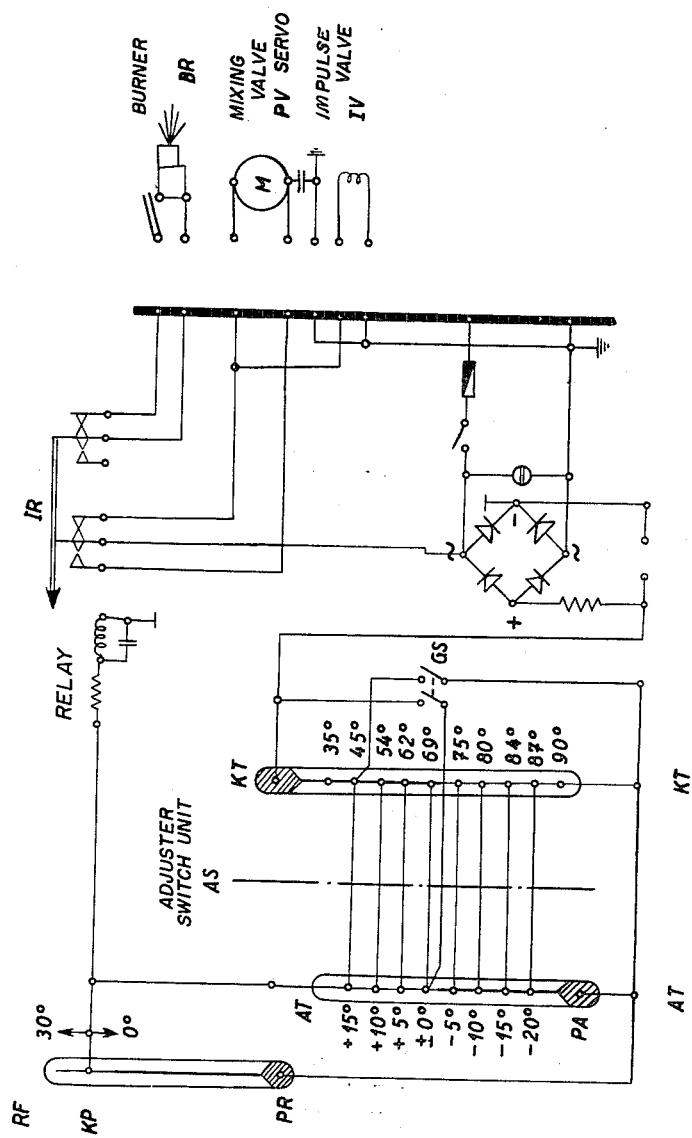

FIG. 4 is a graph showing the temperature curves of the heating medium controlled by the proposed system, FIG. 5 is a circuit for lowering the temperature at night, FIG. 6 is a circuit for automatically controlling the multi-position system including a temperature reduction at night, FIG. 7a is a modification of the circuit shown in FIG. 6, showing a regulating circuit for multi-position operation, comprising secondary measuring units, FIG. 7b is a combination of FIGS. 3a and 7a, FIG. 8 is the heating curve for a self-regulating multi-position circuit, FIG. 9 is an economy control for the heating medium, FIG. 10 is a shut-off control at low temperature to prevent condensation, FIG. 11 are two combined anti-freezing circuits for protecting sanitary installations in a house as well as the central heating plant, and FIG. 12 is the circuit of a combined simple but self-contained control system.

In FIG. 1, AT is an external or "outside" thermometer filled with a thermometric liquid which conducts electricity. The thermometric liquid in the thermometer bulb PA is electrically connected via a control relay IR for operating the controls of a heating system burner, with one pole of a source of current SQ. The relay IR may for example operate a mixing valve for mixing hot and cold heating fluids instead of the burner controls. Moreover, the thermometric column is electrically tapped at points AZ on the thermometer scale representing temperatures —20°, —16°, —12° and so forth. These taps are inversely connected with taps KS representing 85°, 80°, 75° and so forth in a contact thermometer KT which measures the temperature of the heating medium, either in the boiler, in the supply or in the return pipe, as may be desired. The thermometric liquid in the bulb PK of this second thermometer is directly connected with the other terminal of the source of current SQ. If the two columns of thermometric liquid in the two thermometers AT and KT rise sufficiently to complete a circuit which permits a current to flow, then the electromagnetic relay IR will be energized and contact 1-4 opened, resulting in the heating installation being shut off. In the illustrated arrangement, the heating system will also be shut off if the outside temperature reaches 15°.

In order to prevent the control relay IR from opening and closing in rapid succession as a result of rises and falls of the thermometric liquid in contact thermometer KT it is advisable to provide delay means. Delayed action may be provided by the inclusion of a conventional RC member. In FIG. 2 an input resistor VW is connected in series with the coil of relay IR which is at the same time shunted by a capacitor LK. This arrangement incidentally permits any inductive sparking at the taps of the thermometer to be suppressed or extinguished.

If the control relay directly controls the burner BR, then points 8 and 5 make contact when relay IR is not energized.

On the other hand, if the relay controls a mixing valve, then voltage from source Ph is applied via terminals 1 and 4 to valve IV. When relay IR operates, contacts 1-4 open and the valve gradually closes.

The object of the on-off fluid control valve PV is to control the temperature stepwise up to the required temperature level. Therefore, the valve PV operates by the so-called on-off method of control. All the valves are readily adaptable to control by the operation of relay IR.

The arrangements according to FIGS. 1 and 2 permit all these three types of valves to be controlled, so that additional control elements are unnecessary.

The circuitry illustrated in FIG. 1 would not be wholly adequate for the control of the heating system in a building. It is therefore proposed to interpose, between the two tapped thermometers AT and KT a multi-position adapter circuit.

The adapter circuits illustrated in FIG. 3a and 3b, which can be used individually or in combination, permit temperature control to be adapted to the particular heating characteristics of the building in question. By reference to FIG. 3a the following description will indicate how this can be done with the aid of two multi-contact two-position relays. In the normal position the switch S1 is closed, that is, relay USI is in "operate" position, and the switch S2 is open, that is, relay USII is in "release" position. The 0° tap of the outside thermometer AT is then connected with the 60° tap of the thermometer KT.

If the heating system is intended to provide more heat, switch S1 is opened, so that the relays USI and USII both release. The 0° tap of AT is then connected with the 65° tap in thermometer KT.

If the heating system is intended to maintain lower temperatures, then the switches S1 and S2 are closed, so that both relays USI and USII are in operate position. The 0° tap on AT will then be connected with the 55° tap of thermometer KT.

By selecting different positions of switches S1 and S2, which switches may be automatically controlled as will be later described, the desired relationship between ambient temperature and the temperature of the heating medium can be established or varied.

Another variation is illustrated in FIG. 3b which shows a manually operable switch AS for establishing three or more different connections. This manual switch is set when the system is assembled. For instance, the system can be set to a heating temperature of 60° when the ambient temperature is 0° (position I, normal house). If the house is a "warm house" which requires less heating, then switch AS can be reset (position II), reducing the heating temperature to 55°. In a "cold house" the heating temperature is set at 65° (position III).

If the two arrangements according to FIGS. 3a and FIG. 3b are combined, the heating curves will be as shown in FIG. 4.

Apart from the normal curve (60°/0°) there are two alternative curves 65°/0° and 55°/0° suitable for a "cold" or a "warm" house, respectively. This adaptability permits the supply temperature to be flexibly varied in relation to the ambient temperature. There is no rigid proportionality curve as in FIG. 4, curve H, curve R or curve T.A. which represent known heating control systems. This flexibility also permits the aggregate control system to operate accurately, as will be understood from the description that follows.

The correction of room temperature according to FIG. 5 by means of a variable room contact thermometer RF permits room temperature to be kept approximately constant, but is applicable only to direct burner control.

Terminal PK (+) of the room thermometer is connected with the mercury in the bulb PR which is connected through the mercury column with tap KP and therethrough with the base point of the mercury PA in the outside thermometer and with control relay IR. As soon as the required room temperature has been reached or a sudden interruption of heat from the outside causes the connection between PR through KP with PA (mercury column) to be made, the circuit of relay IR will be closed and the heating system shut off. However, if the required room temperature which is preset by the position of tap KP should not be reached, then the manual switch AS must be set to "warmer." This corresponds with adapting the system to a "cool house."

Moreover, by manually setting the tap KP to a lower temperature, the system can be adapted to a reduced night room temperature. Thermometers AT and KT and their base terminals PA and PK then cease to have an effect because they are by-passed.

In order to ensure that the system functions as required, the regulating thermostat usually existing at the boiler must be dispensed with because, if this is set too low, the proper functioning of the control system could be affected if the water temperature were required to rise above the thermostat setting. The boiler temperature is then free to rise to the maximum determined by a safety thermostat, not shown.

Furthermore, in this circuit, the hot water temperature must be a little above the heating curve to provide sufficient energy for PR to be connected with KP (room temperature reached).

However, the night temperature reduction need not be set on thermometer RF by hand. Control may be effected by means of a time switch U with the aid of the regulating thermostat Th usually associated with the boilers. The following switching positions are possible.

1. Day, normal. Night, normal. The main switch NS is on and switches S2 and S1 are closed.
2. Day, normal. Night, reduced. The main switch NS is on, switch S2 is closed and switch S1 is open.
3. Day, reduced. Night, reduced. The main switch NS is on and switches S2 and S1 are open.

An unexceptionable night reduction is not assured in a circuit according to FIG. 5 because this must be set via the regulating thermostat. In the circuit according to FIG. 6, two tapped room thermometers RF1 and RF2 are provided. Both thermometers may be variably adjustable or they may have fixed taps KP1 and KP2. The desired room night reduction temperature is set on thermometer RF2. The two room thermometers RF1 and RF2 permit the following operational positions to be selected.

1. Day, normal. Night, normal.
2. Day, normal. Night, reduced.
3. Day, reduced. Night, reduced.
4. Day, full load.

The switches S1 and S1A as well as S2 and S2A are coupled in the form of two-way two-position switches.

When the selected position is Day, normal and Night, normal, the switches S1 and S2 are open. The thermometer RF2 is then inoperative. Temperature control is via the thermometer RF1. Time switch U is open.

When the selected position is Day, normal and Night, reduced, the switch S1 is closed and the switch S2 is open.

When the time switch U closes at night or in the evening (night position) + of point PR2 is connected through the mercury column with the tap KP2, the switch S1 and time switch U with the relay IR. Heating is shut off until the room has cooled and the mercury column is below the tap KP2. The relay then releases and closes the heating circuit. The preset reduced night temperature is kept constant.

When the selected position is Day, reduced and Night, reduced, the switch S1 is open and the switch S2 is closed. In this position the control signal is derived only from the thermometer RF2 and the reduced room temperature remains operative day and night. The time switch remains open.

When the selected position is Day, full load, the switches S1 and S2 are closed. The switches S1A and S2A will then be open and the connection from plus to points PR1 and PR2 is broken. Relay IR releases and causes full load heating for as long as required (maximum controlled by safety thermostat). If the two switches S1 and S2 of the electrical adapter group (FIG. 3a) are replaced by a correcting thermometer RK with fixed taps according to FIG. 7a, the adapted function becomes fully automatic.

However, since exclusive control by means of an adapter group does not appear to be wholly advisable provision must be made for relative correction.

In FIG. 7a, a correcting tapped thermometer RK is shown with four taps.

If room temperature is between 20°/21° (desired room temperature) then conditions are normal. However, if the temperature drops to 19° then the connection between + through bulb PR, tap 19° of the correcting thermometer RK to bulb PA will be broken, relay IR will release and control the boiler or mixing valve to full load. As soon as point 19° is reached the multi-position function via relay USI and relay USII begins.

Assuming that in the room having the thermometer, which is usually the living room or the manager's office, the window is opened, the temperature in such room will then immediately drop, causing the heating output to be raised and the other rooms to be overheated. In order to prevent this from happening, switch TS is closed before the window is opened or the switch is closed by the window being opened. At most, the temperature in the other rooms will rise as far as the automatic adapter group in position "warmer" permits.

However, if, as the result of an influx of heat from the outside, the temperature rises above 22°, then + may be directly connected with relay IR, not shown, because an additional safeguard is provided, and the heating process may be stopped either via the boiler or via the mixing valve in the supply pipe.

If after a drop in temperature, following shut off or night time temperature reduction, the restoration of normal room temperature is desired via a time switch or the like, then there is assured rapid reheating after the above-described switch operation until the first point 19° on the thermometer RK has been reached. The hot water temperature then adjusts itself with reference to the outside temperature.

FIG. 7b is a combination of FIGS. 3a and 7a.

The curves in FIG. 8 show that the room standard temperature is reached in the shortest period of time (see curve X). Curve Y, which represents the known thermostatic control, likewise shows rapid heating but the required temperature may not be reached or it may be exceeded and eventually establishes itself by slow oscillations. A room temperature control based exclusively on an outside temperature-sensitive element Z requires a long time before the required temperature is actually reached.

The two curves Y and Z are based on the assumption that the hot water temperature is adjusted to the outside temperature, as otherwise the proper functioning of this known method of control is in any event very doubtful.

In control systems hitherto used in actual practice, which are based upon relative matching, but which use room correcting thermostats, the latter are provided in one room only. Naturally, room thermometers must be provided in several places if the heating circuits are separate. However, it is impossible in heating controls hitherto known in single-circuit heating systems for buildings to effect control by reference to several room thermometers. Such a multiple system of control is hereinafter described. As hereinbefore mentioned, cooling of the room having the thermometers may cause other rooms to be overheated. A switch TS is provided to prevent this.

However, assuming that the operation of switch TS (FIGS. 7a and 7b) is forgotten, such as, for example, in a hotel, then overheating of the other rooms would result. However, if a room thermometer feeler RTN is provided in several rooms, or at least in one other room, and the thermometer undertakes the functions of the switch TS, then overheating of other rooms cannot occur. These room contact thermometers which must be set to operate slightly below the temperature tap of the thermometer RK, that is, 19°, have the following functions.

If the sensed room as such is cooled by opening a window, and all rooms are maintained above 18°, then it is necessary to bridge the thermometer RK from 19° to PR. This bridging is effected because the bulb PTN of the thermometer RTN is connected by the mercury column at 18°. If the entire building is then suddenly cooled and the temperature drops in the rooms having the correcting thermometers RTN in cooperation with the principal thermometers RK to a common 18° or 19° level (switch TS must naturally be open) then full load operation will begin until the required temperature has been restored throughout the building.

If in the principal room having the thermometer, the thermometer RK raises the temperature, for example, as a result of the arrival of a large number of visitors, or by the operation of an electric stove, and the temperature rises above 22°, then the direct connection with relay IR will automatically completely shut off the mixing valve or the heating system. The temperature in the other rooms would then quickly drop below the level necessary for comfort. In order to prevent such a drop, the single control hereinafter described is provided. If the temperature indicated by the thermometer RTH in the principal room rises above 22° and the other correcting room temperature thermometers RTH indicate temperatures above 20°, then the heating system can shut down completely. However, if the correcting thermometers RTH fall below 20°, then the connection between the 22° tap of the room thermometer RK via bulb PTH to the 20° tap of the room thermometer RTH to the relay IR will be interrupted. The adapter group therefore begins to function via point 21. Naturally, overheating of the principal room with the thermometer will result, and there is no alternative but to open the window or to switch off the surplus heat.

When individual groups of secondary room thermometers RTN or RTH are connected in parallel, any desired number of such secondary room thermometers may be provided. In a hotel it would be possible for overheating or undercooling to occur in several rooms simultaneously but a readjustment of heating temperature throughout the hotel would not then be required.

In a known automatic temperature control with a mixing valve in the supply pipe it is essential, as set forth in regulations, that the boiler temperature should be run up to the temperature of the safety thermostat (about 90°) irrespectively of warmer or colder weather. This is understandable because the temperature must be available to provide a supply temperature or 85° or 90° when the outside temperatures are low. Supply temperatures above 75°–80° are needed only if outside temperatures are very low. However, if these temperatures are within the normal range, that is, if the supply temperature is between 60° and 65° or even lower, then the boiler will radiate a considerable amount of heat because of the high boiler temperature. In the circuit shown in FIG. 9, contact point 70° of the contact thermometer KT is tapped for connection with the thermostat relay TR. The regulating thermostat which is set to 75° at the boiler will therefore not permit the temperature to rise beyond 75°. This is a normal boiler temperature.

If a higher supply temperature than 70° is required, the voltage is applied through bulb PK and the mercury column to the coil of relay TR which operates and bridges the regulating thermostat. Not until this happens will the boiler temperature rise to the temperature of the safety thermostat (90°). Due to this absolute adaptation it is immaterial what external temperature is needed (different buildings) to provide a supply temperature of 70°. If, according to the illustrated curves, the building is a "warm" or a "cool" house, then the external temperature in relation to the 70° of the thermometer KT will simply be correspondingly higher or lower. Primarily decisive is the contact of the thermometer KT at 70°, that is, the required supply temperature. The setting (75°) of the regulating thermostat should be above the tap 70° of the thermometer KT (by about 5°) to prevent inaccuracies of the regulating thermostat from adversely affecting control.

Alternatively, the circuit may be such that at full load, for example, when starting the heating system, the boiler temperature rises above 70° to 90° until the room temperatures have adjusted themselves to 70°. This is also the case when a boiler is added and the water derived therefrom calls for more heat.

Various other circuit arrangements may be associated with the described control circuit such as, for example, for automatic control, and especially for safety purposes.

In FIG. 10 when the heating temperature drops below 55° the circulating pump is automatically stopped. Normal operation is not restored until a mean temperature of 65° has been reestablished.

FIG. 11 shows a freezing protection switch GS for preventing sanitary installations in the building from freezing. When the switch GS is closed this circuit starts the heating system whenever the outside thermometer registers less than a preset minimum temperature. Since it is often desirable to confine the freezing protection to the heating plant without reference to other installations in the building, switch GL is provided which permits current to flow through the 20° tap when it is closed.

Alternatively the tap +4° on the outside thermometer can be directly connected with the burner control circuit in order to start up the system for preheating the boiler water when the latter temperature is reached.

Another possibility is the boiler preselector circuit which permits the heating output to be temporarily reduced when a considerable volume of boiler water is being used, in order to compensate for the loss in boiler water.

Furthermore, the heating output can be reduced for instance by inactivating the circulating pump when outside temperatures are high, thus leaving only a small degree of natural circulation. This is particularly useful for control during the summer.

Both in the performance of the switching operations and in the operation of the valves, delay means may be deliberately included.

All the numerical data given herein for the taps are merely illustrative. The temperatures which are actually set depend upon existing local conditions.

FIG. 12 is a simple general control system combining several of the aforedescribed features. FIG. 12 shows two thermometers AT and KT with inversely interconnectable temperature taps with an interposed adapter switch unit AS, a freezing protector GS for sanitary installations, a simple room thermometer RF without safety means and a control relay IR. At the right of FIG. 12 are all the elements controlled by the system, such as a burner, a reversing servo for the mixing valve, an impulse valve, and a boiler thermostat.

The described system and its several modifications may be used for the simultaneous control of several circulating circuits and of several heating boilers. For this purpose for example, only one outside thermometer, several time switches or a multiple time switch are required.

What is claimed is:

1. An automatic heat control system for building interiors comprising two thermometers each having electrically conducting thermometric materials and a plurality of electric taps along the expansion path of said material so that the respective taps correspond to particular temperatures, one of said thermometers being responsive to a heating medium and one to the ambient temperature outside the building, circuit means connecting the taps of one thermometer in descending temperature order to taps of the other thermometer in ascending temperature order, relay means having a coil connected to one of said thermometric materials, said relay means being connectable to a burner for changing the temperature of the heating medium, said circuit means including electrically actuable switch means interposed in the connections between the taps of one of said thermometers and the correspondingly connected taps of the other of said thermometers for varying the connection of said taps on said thermometers so that the condition for relay operation varies, a third thermometer having a thermometric liquid and electric taps for responding to the building-interior temperature, and network means for connecting the thermometric liquid of said third thermometer to the thermometric liquid of one of said first-mentioned two thermometers, for connecting said third thermometer to a source of current and for connecting the taps of said third thermometer to said switch means for varying said switch means in dependence upon the building-interior temperature.

2. An automatic heat control system for buildings comprising two thermometers each having electrically conducting thermometric materials and a plurality of electric taps along the expansion path of said material so that the respective taps correspond to particular temperatures, one of said thermometers being responsive to a heating medium and one to the ambient temperature outside the building, circuit means connecting the taps of one thermometer in descending temperature order to taps of the other thermometer in ascending temperature order, relay means having a coil connected to one of said thermometric materials so as to be energized by currents through the thermometric material, said relay means being connectable in response to current through the coil to a burner for changing the temperature of the heating medium, said circuit means including electrically actuable switch means interposed in the connections between the taps of one of said thermometers and the correspondingly connected taps of the other of said thermometers having a plurality of settings for varying the connection of said taps on said thermometers so that the condition for burner operation varies, a third thermometer having a thermometric liquid and electric taps for responding to the building-interior temperature, each of said taps on said third thermometer being connected to said switch means and corresponding to one of its settings so that when one tap is contacted by said thermometric material current can flow and actuate said switch means to shift into settings corresponding to the contacted taps, and further circuit means connecting the thermometric liquid of said third thermometer to the thermometric liquid of one of said first-mentioned two thermometers.

3. An automatic heat control system for buildings comprising two thermometers each having electrically conducting thermometric materials and a plurality of electric taps along the expansion path of said material so that the respective taps correspond to particular temperatures, one of said thermometers being responsive to a heating medium and one to the ambient temperature outside the building, circuit means connecting the taps of one thermometer in descending temperature order to taps of the other thermometer in ascending temperature order, relay means having a coil connected to one of said thermometric materials so as to be energized by currents through the thermometric material, said relay means being connectable to a burner for changing the temperature of the heating medium, said circuit means including switch means interposed in the connections between the taps of one of said thermometers and the correspondingly connected taps of the other of said thermometers for varying the connection of said taps on said thermometers so that the condition for burner operation varies, a third thermometer having a thermometric liquid and electric taps for responding to the building-interior temperature, the electric taps of said third thermometer including a comfort tap corresponding to a predetermined minimum comfort temperature within the building and being connected with said coil through said comfort tap and said thermometric material, whereby when a voltage exists between the third thermometer and the coil the heating medium is heated in response to an interior temperature less than the predetermined minimum comfort temperature, and further circuit means connecting the thermometric liquid of said third thermometer to the thermometric liquid of one of said first-mentioned two thermometers and connecting the taps of said third thermometer to said switch means.

4. A device as in claim 3 wherein a selectively actuable contact is connected to short circuit said tap and further comprising two supplemental thermometers having conductive thermometric materials and respective taps corresponding to respective temperatures lower and higher than said comfort temperature connected to said third thermometer.

5. A device as in claim 4 wherein said third thermometer possesses an overheat tap connected directly to said relay coil whereby upon the third thermometer being exposed to the overheat temperature the coil is energized to prevent heating of the heating medium.

References Cited by the Examiner

UNITED STATES PATENTS

| | | | |
|---|---|---|---|
| 1,521,692 | 1/1925 | McDermott | 236—36 |
| 1,883,015 | 10/1932 | Shipley | 236—91 |
| 2,089,653 | 8/1937 | Kiss. | |
| 2,425,998 | 8/1947 | Crise | 236—91 X |

FOREIGN PATENTS 803,814   7/1936   France.

WILLIAM F. O'DEA, *Acting Primary Examiner.*

FREDERICK L. MATTESON, Jr., ALDEN D. STEWART, EDWARD J. MICHAEL, *Examiners.*